(12) United States Patent
Kobayashi et al.

(10) Patent No.: US 8,927,650 B2
(45) Date of Patent: Jan. 6, 2015

(54) RADICAL POLYMERIZABLE COMPOSITION, CURED PRODUCT, AND PLASTIC LENS

(71) Applicant: DIC Corporation, Tokyo (JP)

(72) Inventors: Nobuo Kobayashi, Ichihara (JP); Akihiro Kondo, Sakura (JP); Atsuhisa Miyawaki, Sakura (JP); Naoya Ikushima, Sakura (JP); Kazuaki Hatsusaka, Kita-Adachi-gun (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/143,388

(22) Filed: Dec. 30, 2013

(65) Prior Publication Data

US 2014/0114037 A1    Apr. 24, 2014

Related U.S. Application Data

(62) Division of application No. 14/125,628, filed as application No. PCT/JP2012/056263 on Mar. 12, 2012.

(30) Foreign Application Priority Data

Jun. 13, 2011  (JP) .................................. 2011-131132
Jun. 14, 2011  (JP) .................................. 2011-132142

(51) Int. Cl.
*C08F 220/18*  (2006.01)
*C08F 220/30*  (2006.01)
(Continued)

(52) U.S. Cl.
CPC ............. *G02B 1/041* (2013.01); *C08F 212/145* (2013.01); *C08L 51/08* (2013.01); *C08F 220/18* (2013.01); *C08F 234/02* (2013.01); *C08F 224/00* (2013.01); *C08F 24/00* (2013.01); *C08F 212/14* (2013.01); *C08F 212/04* (2013.01); *C08F 212/02* (2013.01); *G02B 1/04* (2013.01); *C08F 212/32* (2013.01); *C08F 212/06* (2013.01); *C08F 290/064* (2013.01); *Y10S 526/937* (2013.01)
USPC ............. 525/49; 526/273; 526/313; 526/347; 526/347.1; 526/937

(58) Field of Classification Search
CPC .... C08F 212/02; C08F 212/04; C08F 212/06; C08F 212/14; C08F 212/145; C08F 212/32; C08F 224/00; C08F 234/02; C08F 24/00
USPC .......... 526/273, 313, 347, 347.1, 937; 525/49
See application file for complete search history.

(56) References Cited

U.S. PATENT DOCUMENTS

2008/0221291 A1 *   9/2008   Invie et al. .................... 526/313

FOREIGN PATENT DOCUMENTS

JP         62-286740 A      12/1987
JP         07-191305 A       7/1995
(Continued)

OTHER PUBLICATIONS

International Search Report dated May 29, 2012, issued for PCT/JP2012/056263.

*Primary Examiner* — Ling Choi
*Assistant Examiner* — David L Miller
(74) *Attorney, Agent, or Firm* — Edwards Wildman Palmer LLP; James E. Armstrong, IV

(57) ABSTRACT

There are provided a radical polymerizable composition having a low viscosity suitable for coating and a cured product and a plastic lens each obtained by curing the composition, the cured product having a high refractive index, good adhesiveness to a plastic film substrate, and good adhesiveness kept even under high-temperature and high-humidity conditions. The radical polymerizable composition includes phenylbenzyl (meth)acrylate (A), an epoxy (meth)acrylate (X) having an aromatic ring in its molecular structure, and a radical polymerization initiator (Y) as essential components.

9 Claims, 6 Drawing Sheets

(51) Int. Cl.
  C08F 220/32  (2006.01)
  C08F 224/00  (2006.01)
  G02B 1/04  (2006.01)
  C08F 212/32  (2006.01)
  C08F 290/06  (2006.01)
  C08F 212/14  (2006.01)
  C08L 51/08  (2006.01)
  C08F 234/02  (2006.01)
  C08F 24/00  (2006.01)
  C08F 212/04  (2006.01)
  C08F 212/02  (2006.01)
  C08F 212/06  (2006.01)

(56) References Cited

FOREIGN PATENT DOCUMENTS

| | | |
|---|---|---|
| JP | 2001-139774 A | 5/2001 |
| JP | 2004-315744 A | 11/2004 |
| JP | 2008-094987 A | 4/2008 |
| JP | 2009-155322 A | 7/2009 |
| JP | 2011-037941 A | 2/2011 |
| JP | 2012-082386 A | 4/2012 |
| JP | 2012-082387 A | 4/2012 |
| WO | WO-2010/113600 A1 | 10/2010 |

* cited by examiner

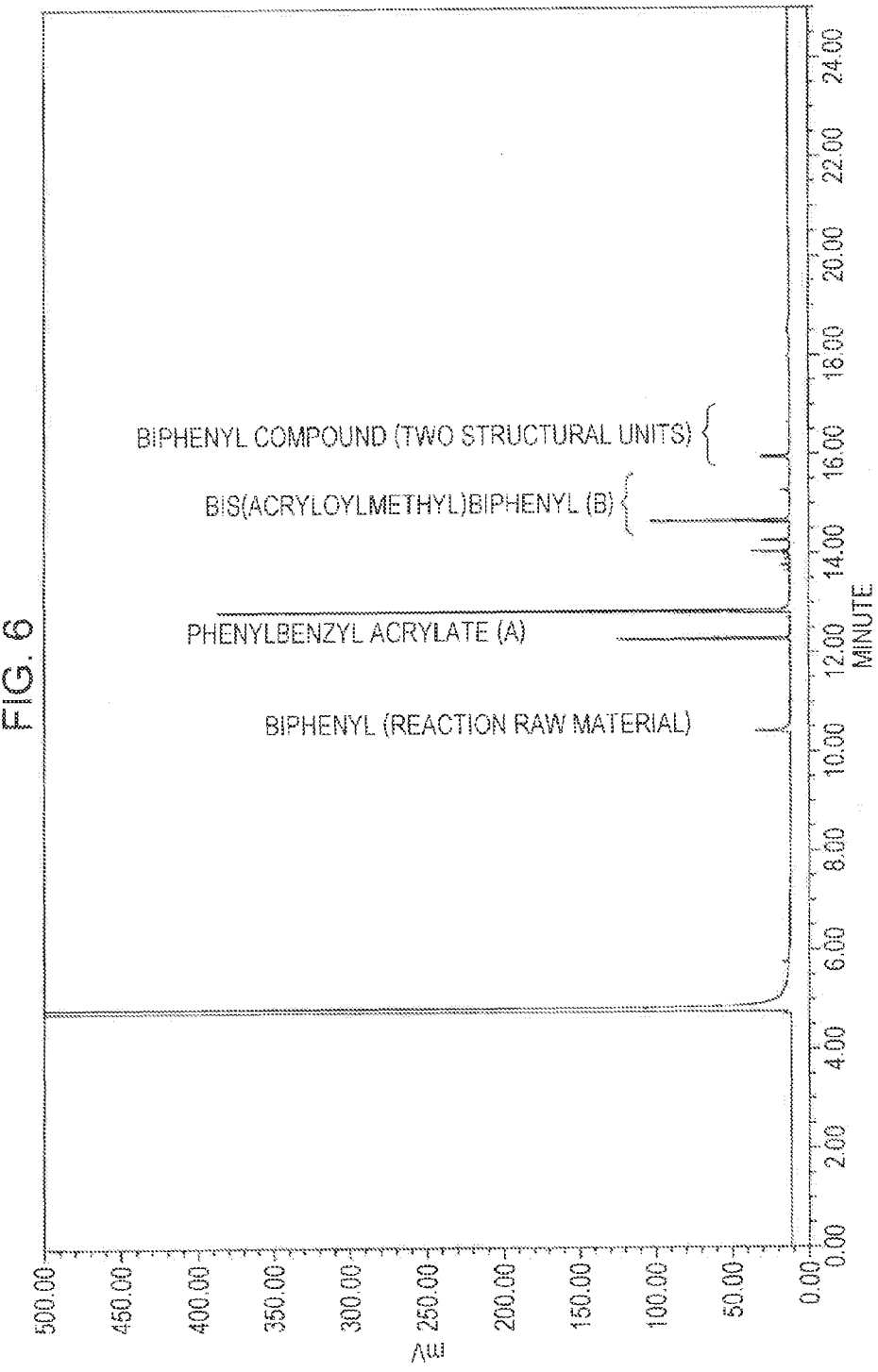

RADICAL POLYMERIZABLE COMPOSITION, CURED PRODUCT, AND PLASTIC LENS

This application is a divisional application of U.S. application Ser. No. 14/125,628, filed Dec. 12, 2013 which claims the right of priority under 35 U.S.C. §119 based on Japanese Patent Application Nos. 2011-131132 and 2011-132142 filed Jun. 13, 2011 and Jun. 14, 2011, respectively.

TECHNICAL FIELD

The present invention relates to a radical polymerizable composition, a cured product obtained by curing the composition, and a plastic lens obtained by curing the composition.

BACKGROUND ART

Various plastic lenses such as prism lenses are produced by, for example, a method in which a resin material is poured into a die, a transparent plastic substrate is placed on the resin material, and the resin material is cured by being heated or by being irradiated with an active energy ray. Therefore, the resin material used to produce plastic lenses needs to have, for example, optical properties such as a high refractive index and high transparency of a cured product, a low viscosity without using a solvent so that the resin material completely fills every cavity of a die and thus has the same shape as that of the die, and good adhesiveness to a transparent plastic substrate.

Among resin materials used for plastic lenses, a compound having a fluorene skeleton has received attention because such a compound forms into a cured product having a high refractive index. However, such a compound has poor adhesiveness to a plastic film substrate such as a polyethylene terephthalate film and thus needs to be used in the form of a mixture with other compounds.

An example of a technique of improving the adhesiveness to a polyethylene terephthalate film using a compound having a fluorene skeleton is a plastic lens resin composition including a diacrylate compound having a fluorene skeleton and ortho-phenylphenoxyethyl acrylate (refer to PTL 1). Such a plastic lens produced from the resin composition has good adhesiveness to a substrate just after the production, but the adhesiveness to a substrate degrades over time and the storage stability is low. In particular, when the plastic lens is stored in a high-temperature and high-humidity environment, for example, transported by ship, the adhesiveness considerably degrades and the plastic lens is raised or detached from the substrate.

CITATION LIST

Patent Literature

PTL 1: Japanese Unexamined Patent Application Publication No. 2008-94987

SUMMARY OF INVENTION

Technical Problem

Accordingly, it is an object of the present invention to provide a radical polymerizable composition having a low viscosity suitable for coating and a cured product and a plastic lens each obtained by curing the composition, the cured product having a high refractive index, good adhesiveness to a plastic film substrate, and good adhesiveness kept even under high-temperature and high-humidity conditions.

Solution to Problem

As a result of thorough studies to achieve the object above, the inventors of the present invention have found the following and have completed the present invention. That is, a radical polymerizable composition including phenylbenzyl (meth)acrylate (A), an epoxy (meth)acrylate (X) having an aromatic ring in its molecular structure, and a radical polymerization initiator (Y) as essential components has a low viscosity suitable for coating without using a solvent and forms into a cured product having a high refractive index, good adhesiveness to a plastic film substrate for a long time, and good adhesiveness kept even under high-temperature and high-humidity conditions.

The present invention relates to a radical polymerizable composition including phenylbenzyl (meth)acrylate (A), an epoxy (meth)acrylate (X) having an aromatic ring in its molecular structure, and a radical polymerization initiator (Y) as essential components.

The present invention also relates to a cured product obtained by curing the radical polymerizable composition.

The present invention also relates to a plastic lens obtained by curing the radical polymerizable composition.

Advantageous Effects of Invention

According to the present invention, there can be provided a radical polymerizable composition having a low viscosity suitable for coating without using a solvent and a cured product and a plastic lens each obtained by curing the composition, the cured product having a high refractive index, good adhesiveness to a plastic film substrate for a long time, and good adhesiveness kept even under high-temperature and high-humidity conditions.

BRIEF DESCRIPTION OF DRAWINGS

FIG. 6 is a gas chromatograph of a mixture (1) obtained in Production Example 6.

DESCRIPTION OF EMBODIMENTS

Figure 1:
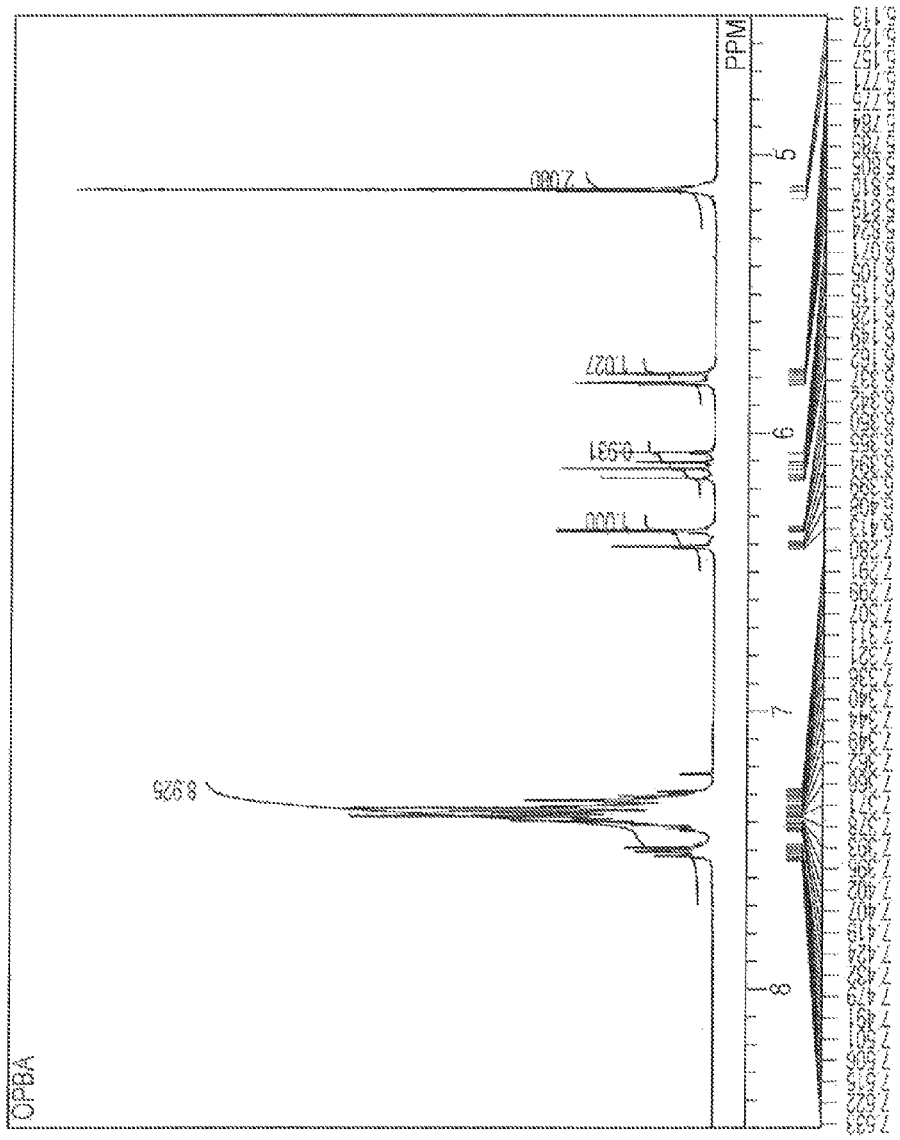
FIG. 1 is a $^1$H-NMR spectrum of ortho-phenylbenzyl acrylate obtained in Production Example 1.
Figure 2:
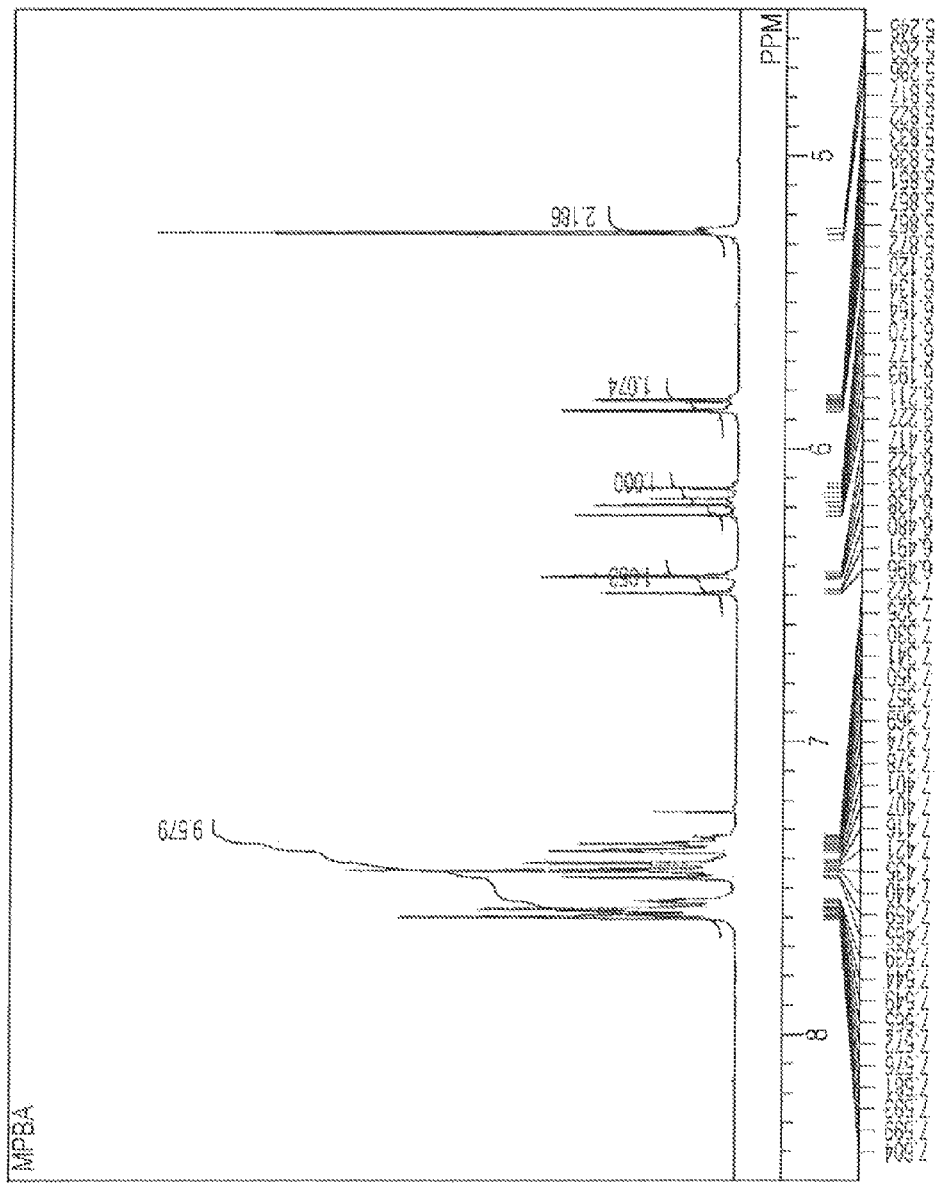
FIG. 2 is $^1$H-NMR of meta-phenylbenzyl acrylate obtained in Production Example 2.
Figure 3:
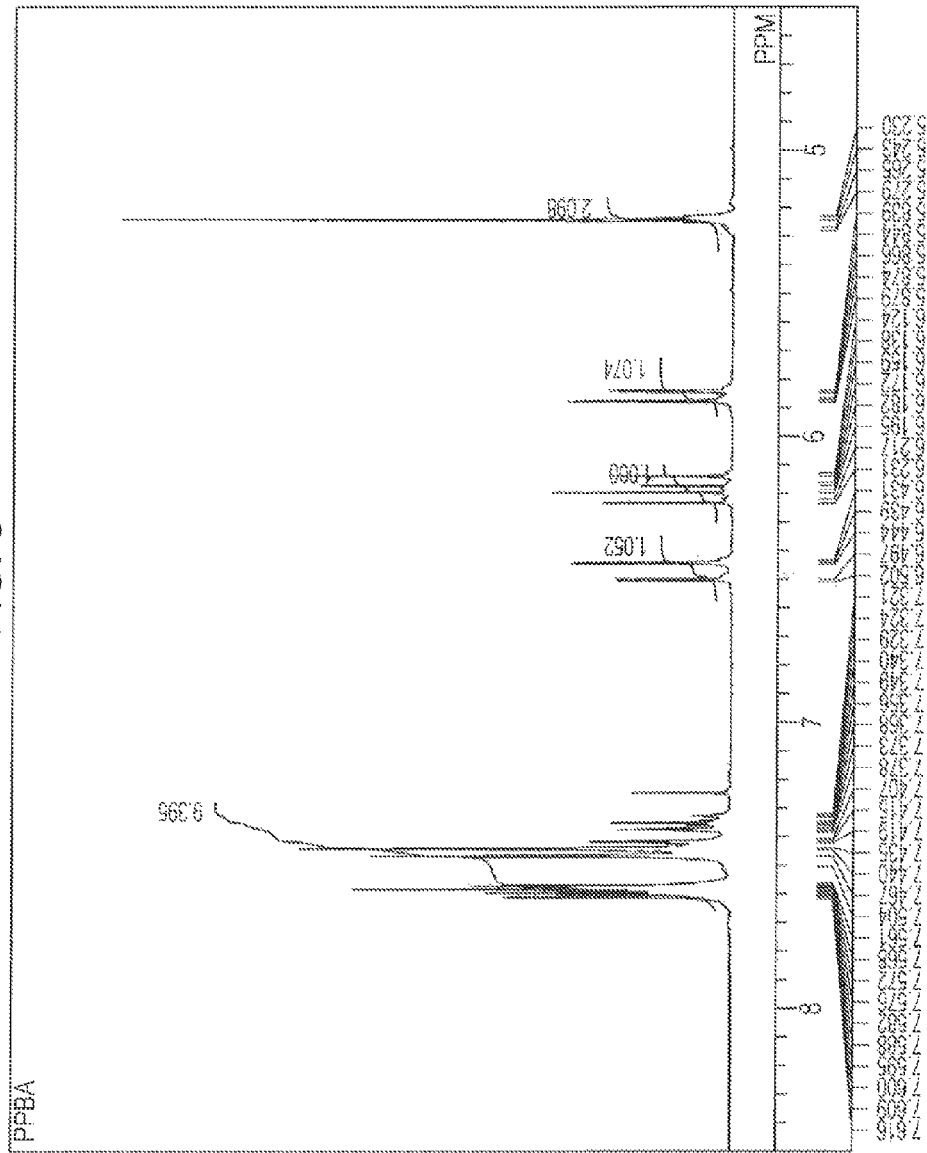
FIG. 3 is $^1$H-NMR of para-phenylbenzyl acrylate obtained in Production Example 3.
Figure 4:
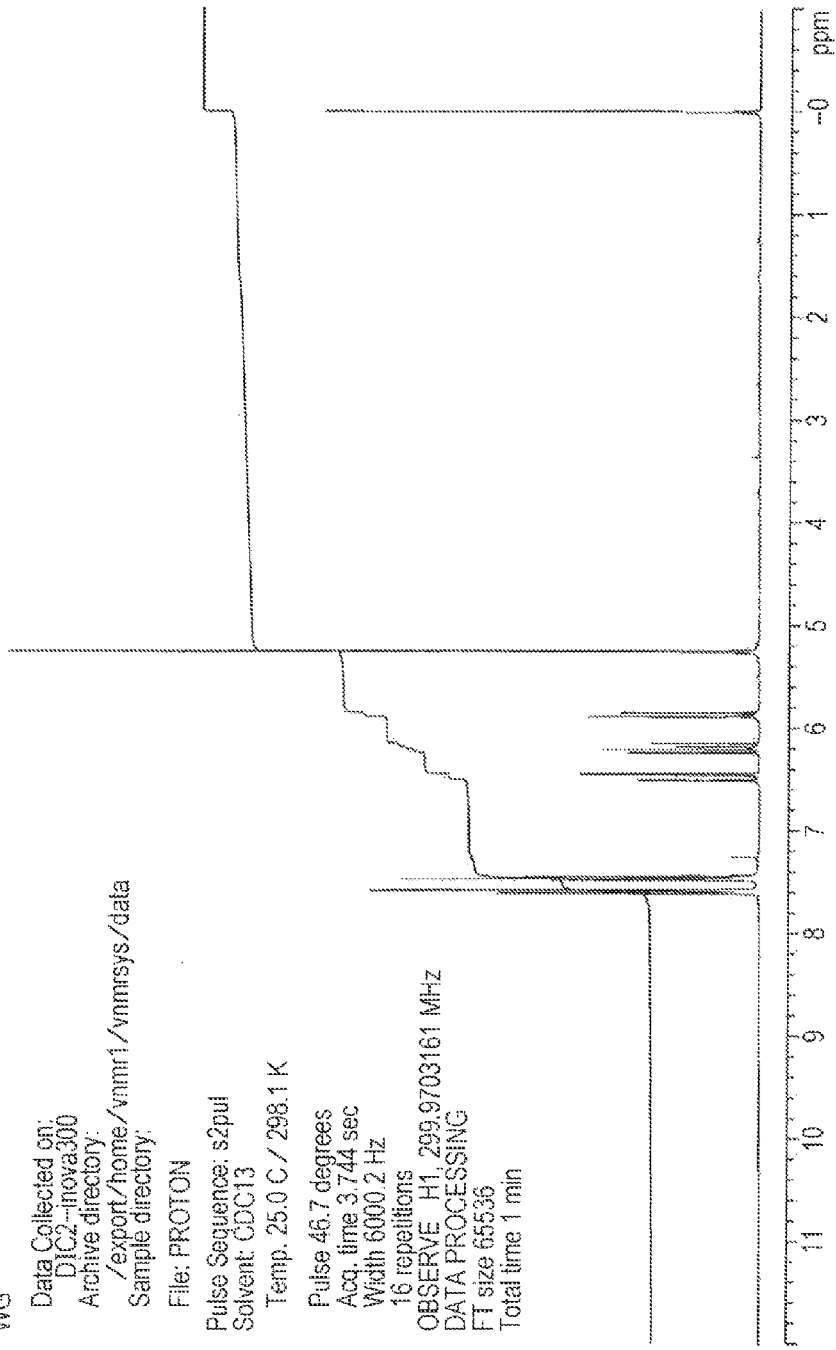
FIG. 4 is $^1$H-NMR of 4,4'-bis(acryloylmethyl)biphenyl obtained in Production Example 4.
Figure 5:
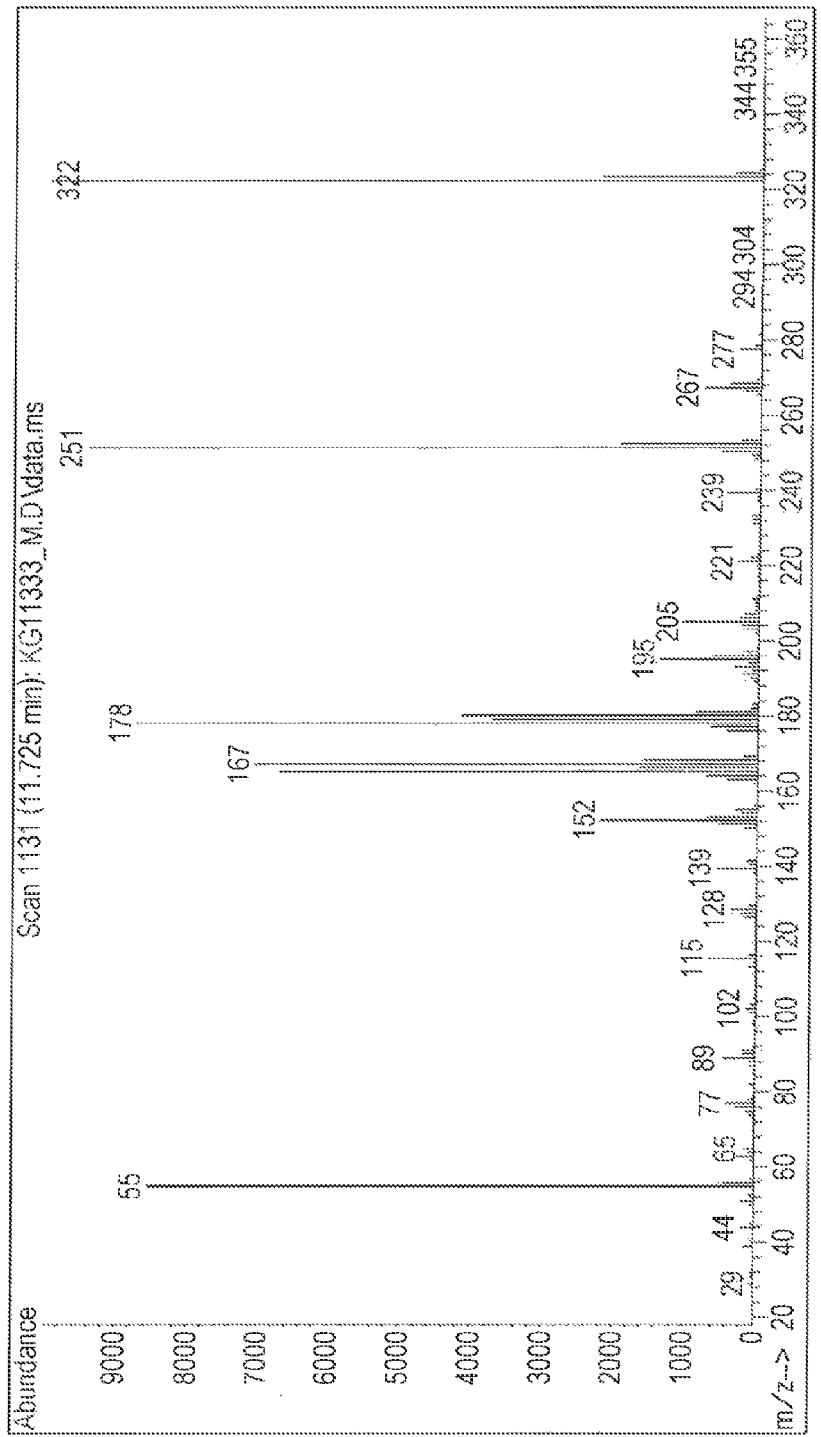
FIG. 5 is a mass spectrum of 4,4'-bis(acryloylmethyl)biphenyl obtained in Production Example 4.

A radical polymerizable composition of the present invention includes phenylbenzyl (meth)acrylate (A) as an essential component, and thus a cured product of the radical polymerizable composition has a high refractive index.

The phenylbenzyl (meth)acrylate (A) includes ortho-phenylbenzyl (meth)acrylate, meta-phenylbenzyl (meth)acrylate, and para-phenylbenzyl (meth)acrylate. In the phenylbenzyl (meth)acrylate (A) of the present invention, these compounds may be used alone or in combination of two or more. Among the compounds, ortho-phenylbenzyl (meth)acrylate and meta-phenylbenzyl (meth)acrylate are preferred because they have a relatively high refractive index and a low viscosity. Specifically, the liquid refractive index is 1.57 or more and the viscosity is 30 mPa·s or less at 25° C. Para-phenylbenzyl acrylate is also preferred because it has a considerably high liquid refractive index of 1.59 or more at 40° C. though it is a solid at ordinary temperature.

In particular, ortho-phenylbenzyl (meth)acrylate, meta-phenylbenzyl (meth)acrylate, and para-phenylbenzyl (meth)acrylate are preferably used in a combined manner because both a low viscosity of the composition and a high refractive index of the cured product can be achieved. The mixing ratio is preferably set such that the molar ratio of ortho-phenylbenzyl (meth)acrylate and meta-phenylbenzyl (meth)acrylate to para-phenylbenzyl (meth)acrylate [{[ortho-phenylbenzyl (meth)acrylate]+[meta-phenylbenzyl (meth)acrylate]}/[para-phenylbenzyl (meth)acrylate]] is 55/45 to 10/90. This is because a radical polymerizable composition that has a low viscosity and forms into a cured product having a high refractive index is obtained.

Furthermore, since ortho-phenylbenzyl (meth)acrylate and para-phenylbenzyl (meth)acrylate can be produced in a simple process, they are preferably used in a combined manner. The mixing ratio is preferably set such that the molar ratio of ortho-phenylbenzyl (meth)acrylate to para-phenylbenzyl (meth)acrylate [[ortho-phenylbenzyl (meth)acrylate]/[para-phenylbenzyl (meth)acrylate]] is 55/45 to 10/90. This is because a radical polymerizable composition that has a low viscosity and forms into a cured product having a high refractive index is obtained.

The phenylbenzyl (meth)acrylate (A) is produced by, for example, a method in which biphenylmethanol and (meth)acrylic acid are esterified or a method in which a halogenated methylbiphenyl such as chloromethylbiphenyl or bromomethylbiphenyl is caused to react with a salt of (meth)acrylic acid and an alkali metal such as potassium, sodium, or lithium.

The radical polymerizable composition of the present invention preferably includes an epoxy (meth)acrylate (X) having an aromatic ring in its molecular structure, in addition to the phenylbenzyl (meth)acrylate (A). This is because a film having good adhesiveness to a plastic film substrate for a long time and good adhesiveness kept even under high-temperature and high-humidity conditions is obtained.

The epoxy (meth)acrylate (X) has an aromatic ring skeleton in its molecular structure and thus is a compound having a high refractive index. Specifically, the refractive index of the epoxy (meth)acrylate (X) is preferably 1.50 or more at 25° C.

An example of the epoxy (meth)acrylate (X) is an epoxy (meth)acrylate obtained by addition reaction of a compound (x1) having an aromatic ring skeleton and an epoxy group in its molecular structure and a monomer (x2) having a (meth)acryloyl group and a carboxyl group.

Examples of the compound (x1) having an aromatic ring skeleton and an epoxy group in its molecular structure include polyglycidyl ethers of aromatic polyols such as hydroquinone, 2-methylhydroquinone, 1,4-benzenedimethanol, 3,3'-biphenyldiol, 4,4'-biphenyldiol, biphenyl-3,3'-dimethanol, biphenyl-4,4'-dimethanol, bisphenol A, bisphenol B, bisphenol F, bisphenol S, 1,4-naphthalenediol, 1,5-naphthalenediol, 1,6-naphthalenediol, 2,6-naphthalenediol, 2,7-naphthalenediol, naphthalene-2,6-dimethanol, and 4,4',4''-methylidynetrisphenol;

polyglycidyl ethers of polyether-modified aromatic polyols obtained by ring-opening polymerization of the aromatic polyol and a cyclic ether compound such as ethylene oxide, propylene oxide, tetrahydrofuran, ethyl glycidyl ether, propyl glycidyl ether, butyl glycidyl ether, phenyl glycidyl ether, or allyl glycidyl ether;

polyglycidyl ethers of lactone-modified aromatic polyols obtained by polycondensation of the aromatic polyol and a lactone compound such as ε-caprolactone;

polyglycidyl ethers of aromatic-ring-containing polyester polyols obtained by a reaction between the aromatic polyol and an aliphatic dicarboxylic acid such as malonic acid, succinic acid, glutaric acid, adipic acid, or pimelic acid;

polyglycidyl ethers of aromatic-ring-containing polyester polyols obtained by a reaction between an aromatic dicarboxylic acid such as phthalic acid, phthalic anhydride, terephthalic acid, isophthalic acid, or o-phthalic acid and the anhydride of the foregoing and an aliphatic polyol such as ethylene glycol, diethylene glycol, propylene glycol, 1,3-propanediol, 1,4-butanediol, 1,3-butanediol, 3-methyl-1,3-butanediol, 1,5-pentanediol, neopentyl glycol, 1,6-hexanediol, trimethylolethane, trimethylolpropane, or glycerin;

bisphenol epoxy resins such as bisphenol A epoxy resin, bisphenol B epoxy resin, bisphenol F epoxy resin, and bisphenol S epoxy resin; and novolac epoxy resins such as phenol novolac epoxy resin and cresol novolac epoxy resin. They may be used alone or in combination of two or more.

Among them, the bisphenol epoxy resins or the novolac epoxy resins are preferably used, and the bisphenol epoxy resins are more preferably used. This is because a cured film having a higher refractive index and good adhesiveness to a plastic film substrate even under high-temperature and high-humidity conditions is obtained. Among the bisphenol epoxy resins, a bisphenol epoxy resin having an epoxy equivalent of 160 to 1000 g/eq is preferably used, and a bisphenol epoxy resin having an epoxy equivalent of 165 to 600 g/eq is more preferably used. This is because a film having a higher refractive index and high hardness is obtained.

Examples of the monomer (x2) having a (meth)acryloyl group and a carboxyl group include (meth)acrylic acid; unsaturated monocarboxylic acids having an ester bond, such as β-carboxyethyl (meth)acrylate, 2-acryloyloxyethylsuccinic acid, 2-acryloyloxyethylphthalic acid, and 2-acryloyloxyethylhexahydrophthalic acid and the lactone-modified products of the foregoing; maleic acid; and carboxyl-group-containing polyfunctional (meth)acrylates obtained by a reaction between an acid anhydride such as succinic anhydride or maleic anhydride and a hydroxyl-group-containing polyfunctional (meth)acrylate monomer such as pentaerythritol triacrylate. They may be used alone or in combination of two or more.

Among them, (meth)acrylic acid is preferably used because a radical polymerizable composition that forms into a cured film having higher surface hardness is obtained. Acrylic acid is more preferably used because a radical polymerizable composition having good curing properties is obtained.

The epoxy (meth)acrylate (X) is produced by, for example, the following method. The compound (x1) having an aromatic ring skeleton and an epoxy group in its molecular structure and the monomer (x2) having a (meth)acryloyl group and a carboxyl group are caused to react with each other at 100° C. to 120° C. optionally using an esterification catalyst such as triphenyl phosphine. In this method, the molar ratio [(Ep)/(COOH)] of an epoxy group of the compound (x1) to a carboxyl group of the monomer (x2) is set to be 1/1 to 1.05/1.

The weight-average molecular weight (Mw) of the thus-obtained epoxy (meth)acrylate (X) is preferably 350 to 5000 and more preferably 500 to 4000 because a composition having a low viscosity and a cured film having good adhesiveness to a plastic film substrate for a long time and good adhesiveness to a substrate even under high-temperature and high-humidity conditions are obtained.

In the present invention, the weight-average molecular weight (Mw) is measured by gel permeation chromatography (GPC) under the following conditions.

Measurement instrument; HLC-8220GPC manufactured by Tosoh Corporation

Columns; TSK-GUARDCOLUMN SuperHZ-L manufactured by Tosoh Corporation
+ TSK-GEL SuperHZM-M×4, manufactured by Tosoh Corporation Detector; RI (differential refractometer)

Data processing; Multistation GPC-8020 model II manufactured by Tosoh Corporation Measurement conditions; Column temperature 40° C.

Solvent tetrahydrofuran

Flow rate 0.35 ml/min

Standard; monodisperse polystyrene

Sample; sample (100 μl) obtained by filtering a tetrahydrofuran solution having a concentration of 0.2 mass % in terms of resin solid matter through a microfilter In the radical polymerizable composition of the present invention, the content of the epoxy (meth)acrylate (X) is preferably 50 to 100 parts by mass and more preferably 55 to 85 parts by mass relative to 100 parts by mass of the phenylbenzyl (meth)acrylate (A) to provide a radical polymerizable composition having a low viscosity suitable for coating without using a solvent, a cured product of the composition that has a high refractive index, and a cured film of the composition that has good adhesiveness to a plastic film substrate for a long time and good adhesiveness even under high-temperature and high-humidity conditions.

The radical polymerizable composition of the present invention further includes a radical polymerization initiator (Y). Examples of the radical polymerization initiator include 1-hydroxycyclohexyl phenyl ketone, 2-hydroxy-2-methyl-1-phenylpropan-1-one, 1-[4-(2-hydroxyethoxy)phenyl]-2-hydroxy-2-methyl-1-propan-1-one, thioxanthone and thioxanthone derivatives, 2,2'-dimethoxy-1,2-diphenylethan-1-one, 2,4,6-trimethylbenzoyldiphenylphosphine oxide, bis(2,4,6-trimethylbenzoyl)phenylphosphine oxide, 2-methyl-1-[4-(methylthio)phenyl]-2-morpholino-1-propanone, and 2-benzyl-2-dimethylamino-1-(4-morpholinophenyl)-butan-1-one.

Examples of commercially available products of the radical polymerization initiator include "IRGACURE-184", "IRGACURE-149", "IRGACURE-261", "IRGACURE-369", "IRGACURE-500", "IRGACURE-651", "IRGACURE-754", "IRGACURE-784", "IRGACURE-819", "IRGACURE-907", "IRGACURE-1116", "IRGACURE-1664", "IRGACURE-1700", "IRGACURE-1800", "IRGACURE-1850", "IRGACURE-2959", "IRGACURE-4043", and "DAROCUR-1173" that are manufactured by Ciba Specialty Chemicals; "Lucirin TPO" manufactured by BASF; "KAYACURE DETX", "KAYACURE MBP", "KAYACURE DMBI", "KAYACURE EPA", and "KAYACURE OA" that are manufactured by Nippon Kayaku Co., Ltd.; "VICURE 10" and "VICURE 55" that are manufactured by Stauffer Chemical Company; "Trigonal P1" manufactured by Akzo; "Sandoray 1000" manufactured by Sandoz Ltd.; "DEAP" manufactured by Upjohn Co.; and "Quantacure-PDO", "Quantacure-ITX", and "Quantacure-EPD" that are manufactured by Ward Blenkinsop & Company Limited.

The content of the radical polymerization initiator is preferably 0.05 to 20 parts by mass and more preferably 0.1 to 10 parts by mass relative to 100 parts by mass of the radical polymerizable composition of the present invention to achieve sufficient curing properties.

In the case where the radical polymerizable composition of the present invention is cured by photopolymerization, a photosensitizer may be added together with the radical polymerization initiator. Examples of the photosensitizer include amines, ureas, sulfur-containing compounds, phosphorus-containing compounds, chlorine-containing compounds, and nitriles and other nitrogen-containing compounds. These photosensitizers may be used alone or in combination of two or more. The amount of the photosensitizer added is preferably 0.01 to 10 parts by mass relative to 100 parts by mass of the radical polymerizable composition of the present invention.

In addition to the phenylbenzyl (meth)acrylate (A), the epoxy (meth)acrylate (X) having an aromatic ring in its molecular structure, and the radical polymerization initiator (Y), the radical polymerizable composition of the present invention preferably further includes the bis[(meth)acryloylmethyl]biphenyl (B) or the biphenyl compound (C) having a molecular structure in which biphenyl structures are bonded to each other through a methylene to provide a composition having a low viscosity and a cured product having a high refractive index. More preferably, the radical polymerizable composition further includes both the bis[(meth)acryloylmethyl]biphenyl (B) and the biphenyl compound (C) having a molecular structure in which biphenyl structures are bonded to each other through a methylene.

Since the bis[(meth)acryloylmethyl]biphenyl (B) used in the present invention has an aromatic ring in its molecular structure, a cured film having a high refractive index can be formed by adding the bis[(meth)acryloylmethyl]biphenyl (B). Since the bis[(meth)acryloylmethyl]biphenyl (B) has two (meth)acryloyl groups in its molecular structure, good curing properties due to radical polymerization are achieved and the toughness of a cured film is improved.

Examples of the bis[(meth)acryloylmethyl]biphenyl (B) include 2,2'-bis(acryloylmethyl)-1,1'-biphenyl, 3,3'-bis(acryloylmethyl)-1,1'-biphenyl, 4,4'-bis(acryloylmethyl)-1,1'-biphenyl, 2,4'-bis(acryloylmethyl)-1,1'-biphenyl, 2,4-bis(acryloylmethyl)-1,1'-biphenyl, and 2,6-bis(acryloylmethyl)-1,1'-biphenyl. They may be used alone or in combination of two or more. Among them, 2,2'-bis(acryloylmethyl)-1,1'-biphenyl, 3,3'-bis(acryloylmethyl)-1,1'-biphenyl, and 4,4'-bis(acryloylmethyl)-1,1'-biphenyl are preferred because of their simple production process, and 4,4'-bis(acryloylmethyl)-1,1'-biphenyl is further preferred.

The bis[(meth)acryloylmethyl]biphenyl (B) is produced by, for example, a method in which biphenyldimethanol and (meth)acrylic acid are esterified or a method in which a bis(halogenated methyl)biphenyl such as bis(chloromethyl)biphenyl or bis(bromomethyl)biphenyl is caused to react with (meth)acrylic acid.

Since the biphenyl compound (C) having a molecular structure in which biphenyl structures are bonded to each other through a methylene according to the present invention has an aromatic ring in its molecular structure, a cured film having a high refractive index can be formed by adding the biphenyl compound (C).

Since the biphenyl compound (C) having a molecular structure in which biphenyl structures are bonded to each other through a methylene has high solubility in other components included in the radical polymerizable composition of the present invention, the number of biphenyl structural units in the molecular structure is preferably 2 to 5.

The biphenyl compound having a molecular structure in which biphenyl structures are bonded to each other through a methylene is produced by, for example, a method in which biphenyl and p-formaldehyde are caused to react with each other in the presence of an acid catalyst.

In the case where the radical polymerizable composition of the present invention includes the bis[(meth)acryloylmethyl]biphenyl (B) or the biphenyl compound (C) having a molecular structure in which biphenyl structures are bonded to each other through a methylene, the content of the epoxy (meth)acrylate (X) is preferably 50 to 100 parts by mass and more preferably 55 to 85 parts by mass relative to 100 parts by mass in total of the phenylbenzyl (meth)acrylate (A) and the bis[(meth)acryloylmethyl]biphenyl (B) or the biphenyl compound (C) having a molecular structure in which biphenyl structures are bonded to each other through a methylene, to provide a radical polymerizable composition having a low viscosity suitable for coating without using a solvent and a cured product of the composition that has a high refractive index and high toughness and is not easily cracked or chipped when cutting.

In the present invention, the content of the phenylbenzyl (meth)acrylate (A) is preferably 30 to 95 parts by mass and more preferably 35 to 85 parts by mass relative to 100 parts by mass in total of the phenylbenzyl (meth)acrylate (A), the bis[(meth)acryloylmethyl]biphenyl (B), and the biphenyl compound (C) having a molecular structure in which biphenyl structures are bonded to each other through a methylene, to provide a radical polymerizable composition that has a low viscosity and forms into a cured product having a high refractive index.

In the present invention, the content of the bis[(meth)acryloylmethyl]biphenyl (B) is preferably 5 to 70 parts by mass and more preferably 15 to 65 parts by mass relative to 100 parts by mass in total of the phenylbenzyl (meth)acrylate (A), the bis[(meth)acryloylmethyl]biphenyl (B), and the biphenyl compound (C) having a molecular structure in which biphenyl structures are bonded to each other through a methylene, to provide a radical polymerizable composition that forms into a cured product having a high refractive index and high toughness.

In the present invention, the content of the biphenyl compound (C) having a molecular structure in which biphenyl structures are bonded to each other through a methylene is preferably 0.5 to 30 parts by mass and more preferably 1 to 25 parts by mass relative to 100 parts by mass in total of the phenylbenzyl (meth)acrylate (A), the bis[(meth)acryloylmethyl]biphenyl (B), and the biphenyl compound (C) having a molecular structure in which biphenyl structures are bonded to each other through a methylene, to provide a radical polymerizable composition that forms into a cured product having a high refractive index.

The radical polymerizable composition of the present invention has a low viscosity and forms into a cured product having a high refractive index and high toughness. To achieve this, the total mass of the phenylbenzyl (meth)acrylate (A), the bis[(meth)acryloylmethyl]biphenyl (B), and the biphenyl compound (C) having a molecular structure in which biphenyl structures are bonded to each other through a methylene is preferably 40 to 75 parts by mass and particularly preferably 45 to 70 parts by mass relative to 100 parts by mass of the non-volatile matter of the radical polymerizable composition.

In the case where the radical polymerizable composition of the present invention includes the phenylbenzyl (meth)acrylate (A), the bis(acryloylmethyl)biphenyl (B), and the biphenyl compound (C) having a molecular structure in which biphenyl structures are bonded to each other through a methylene, these compounds can be simultaneously produced by a single reaction. Such a radical polymerizable composition is, for example, a radical polymerizable composition obtained by causing biphenyl, a hydrogen halide, and a formaldehyde derivative to react with one another to obtain a reaction mixture and then causing the reaction mixture to react with acrylic acid or an alkali metal acrylate.

The radical polymerizable composition may include, as a by-product of the reaction, a compound other than the phenylbenzyl (meth)acrylate (A), the bis[(meth)acryloylmethyl]biphenyl (B), and the biphenyl compound (C) having a molecular structure in which biphenyl structures are bonded to each other through a methylene. In this case, the total mass of the phenylbenzyl (meth)acrylate (A), the bis[(meth)acryloylmethyl]biphenyl (B), and the biphenyl compound (C) having a molecular structure in which biphenyl structures are bonded to each other through a methylene is preferably 50 to 95 parts by mass and more preferably 65 to 80 parts by mass relative to 100 parts by mass of the composition, to provide a radical polymerizable composition that has a lower viscosity and forms into a cured product having higher hardness.

A specific example of the method for simultaneously producing the radical resin composition including the phenylbenzyl (meth)acrylate (A), the bis(acryloylmethyl)biphenyl (B), and the biphenyl compound (C) having a molecular structure in which biphenyl structures are bonded to each other through a methylene by a single reaction is a method in which biphenyl, a hydrogen halide, and a formaldehyde derivative are caused to react with each other in the presence of an acid catalyst to obtain a mixture including the biphenyl compound (C) having a molecular structure in which biphenyl structures are bonded to each other through a methylene, biphenyl, and a methylchloro compound of biphenyl; and then the methylchloro compound of biphenyl included in the mixture is caused to react with acrylic acid or an alkali metal acrylate to obtain a mixture including the phenylbenzyl (meth)acrylate (A) and the bis[(meth)acryloylmethyl]biphenyl (B).

In the case where the phenylbenzyl (meth)acrylate (A), the bis(acryloylmethyl)biphenyl (B), and the biphenyl compound (C) having a molecular structure in which biphenyl structures are bonded to each other through a methylene are produced by the above-described method, the ratio of the phenylbenzyl (meth)acrylate (A), the bis[(meth)acryloylmethyl]biphenyl (B), and the biphenyl compound (C) having a molecular structure in which biphenyl structures are bonded to each other through a methylene can be suitably adjusted by changing the amount of the formaldehyde derivative used in the reaction and the types and amounts of the acid catalyst and organic acid. Specifically, the amount of formaldehyde used is preferably 1 to 25 moles and more preferably 1.5 to 5 moles relative to 1 mole of biphenyl to adjust the ratio in the preferred range described above. Examples of the formaldehyde derivative include formalin, p-formaldehyde, and trioxane. The molar ratio of the hydrogen halide to biphenyl is preferably excessively high, and examples of the hydrogen halide include concentrated hydrochloric acid and hydrogen chloride gas. Examples of the acid catalyst used in the reaction include sulfuric acid, phosphoric acid, polyphosphoric acid, trichloroacetic acid, dichloroacetic acid, monochloroacetic acid, methanesulfonic acid, p-toluenesulfonic acid, and Lewis acid such as zinc chloride. In the reaction, an organic solvent such as dimethoxyethane, dioxane, cyclopentyl methyl ether, or acetic acid may be used. The reaction temperature is preferably 60° C. to 180° C. and more preferably 70° C. to 120° C. The reaction time is preferably 3 to 60 hours and more preferably 15 to 45 hours.

In the case where the phenylbenzyl (meth)acrylate (A), the bis(acryloylmethyl)biphenyl (B), and the biphenyl compound (C) having a molecular structure in which biphenyl structures are bonded to each other through a methylene are produced by the above-described method, biphenyl may remain in the composition as an unreacted raw material. In the present invention, the content of biphenyl is preferably 0.5 to 15 parts by mass and more preferably 1 to 10 parts by mass relative to 100 parts by mass of the non-volatile matter of the radical polymerizable composition because a high refractive index is achieved and a composition having a low viscosity is obtained.

The ratio of the components included in the radical polymerizable composition obtained by the above-described method is measured by, for example, capillary gas chromatography, liquid chromatography, or gel permeation chromatography. Specifically, a temperature-programmed analysis is performed from 50° C. to 325° C. using a capillary column such as "HP-1" (liquid phase: 100% dimethylpolysiloxane) manufactured by Agilent Technologies. The degree of polymerization of the biphenyl compound (C) included in the product is determined by a method in which components other than the phenylbenzyl (meth)acrylate (A) and the bis (acryloylmethyl)biphenyl (B), which are removed by silica gel column chromatography, are analyzed using a gas chromatography-mass spectrometer (GC-MS) or a high-performance liquid chromatography-mass spectrometer (LC-MS).

In addition to the phenylbenzyl (meth)acrylate (A), the epoxy (meth)acrylate (X) having an aromatic ring in its molecular structure, and the radical polymerization initiator (Y), the radical polymerizable composition of the present invention may further include, in a combined manner, a (meth)acrylate compound (Z) other than the phenylbenzyl (meth)acrylate (A) and the bis[(meth)acryloylmethyl]biphenyl (B).

Examples of the (meth)acrylate compound (Z) include monofunctional (meth)acrylate compounds such as n-butyl (meth)acrylate, isobutyl (meth)acrylate, tert-butyl (meth) acrylate, n-pentyl (meth)acrylate, n-hexyl (meth)acrylate, n-octyl (meth)acrylate, isooctyl (meth)acrylate, 2-ethylhexyl (meth)acrylate, benzyl (meth)acrylate, phenoxyethyl (meth) acrylate, phenoxydiethylene glycol (meth)acrylate, glycidyl (meth)acrylate, morpholine (meth)acrylate, 2-hydroxyethyl (meth)acrylate, 2-hydroxypropyl (meth)acrylate, 4-hydroxybutyl (meth)acrylate, diethylene glycol mono(meth)acrylate, triethylene glycol mono(meth)acrylate, dipropylene glycol mono(meth)acrylate, 2-methoxyethyl (meth)acrylate, methoxydiethylene glycol (meth)acrylate, methoxytriethylene glycol (meth)acrylate, methoxypolyethylene glycol (meth) acrylate, 2-butoxyethyl (meth)acrylate, butoxytriethylene glycol (meth)acrylate, 2-ethoxyethyl (meth)acrylate, 2-(2-ethoxyethoxy)ethyl (meth)acrylate, ethoxypolyethylene glycol (meth)acrylate, 4-nonylphenoxyethylene glycol (meth) acrylate, tetrahydrofurfuryl (meth)acrylate, caprolactone-modified tetrahydrofurfuryl (meth)acrylate, cyclohexyl (meth)acrylate, isobornyl (meth)acrylate, 2-hydroxy-3-phenoxypropyl (meth)acrylate, cyclohexyl (meth)acrylate, cyclohexylmethyl (meth)acrylate, cyclohexylethyl (meth) acrylate, dicyclopentanyl (meth)acrylate, dicyclopentanyloxyethyl (meth)acrylate, dicyclopentenyl (meth)acrylate, dicyclopentenyloxyethyl (meth)acrylate, and phenylphenoxyethyl acrylate;

di(meth)acrylate compounds such as ethylene glycol di(meth)acrylate, diethylene glycol di(meth)acrylate, triethylene glycol di(meth)acrylate, polyethylene glycol di(meth) acrylate, propylene glycol di(meth)acrylate, dipropylene glycol di(meth)acrylate, tripropylene glycol di(meth)acrylate, butylene glycol di(meth)acrylate, tetrabutylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, di(meth)acrylate of an ethylene oxide adduct of bisphenol A, di(meth)acrylate of a propylene oxide adduct of bisphenol A, di(meth)acrylate of an ethylene oxide adduct of bisphenol F, di(meth)acrylate of a propylene oxide adduct of bisphenol F, dicyclopentanyl di(meth)acrylate, glycerol di(meth)acrylate, neopentyl glycol hydroxypivalic acid ester di(meth)acrylate, caprolactone-modified hydroxypivalic acid neopentyl glycol di(meth)acrylate, tetrabromobisphenol A di(meth)acrylate, hydroxypivalaldehyde-modified trimethylolpropane di(meth)acrylate, and 1,4-cyclohexanedimethanol di(meth) acrylate; and trifunctional or higher functional (meth)acrylate compounds such as trimethylolpropane tri(meth)acrylate, tri (meth)acrylate of an ethylene oxide adduct of trimethylolpropane, tri(meth)acrylate of a propylene oxide adduct of trimethylolpropane, pentaerythritol tri(meth)acrylate, glycerol tri(meth)acrylate, tri(meth)acrylate of an alkyl modified-dipentaerythritol, ditrimethylolpropane tetra(meth)acrylate, tetra(meth)acrylate of an ethylene oxide adduct of ditrimethylolpropane, tetra(meth)acrylate of a propylene oxide adduct of ditrimethylolpropane, penta(meth)acrylate of dipentaerythritol, and hexa(meth)acrylate of dipentaerythritol. These compounds may be used alone or in combination of two or more.

Among them, benzyl (meth)acrylate, phenoxyethyl (meth) acrylate, phenylphenoxyethyl acrylate, di(meth)acrylate of an ethylene oxide adduct of bisphenol A, and di(meth)acrylate of a propylene oxide adduct of bisphenol A are preferred because a radical polymerizable composition that forms into a cured product having a higher refractive index is obtained.

In the case where the radical polymerizable composition of the present invention includes the (meth)acrylate compound (Z), the total mass of the phenylbenzyl (meth)acrylate (A), the bis[(meth)acryloylmethyl]biphenyl (B), and the biphenyl compound (C) having a molecular structure in which biphenyl structures are bonded to each other through a methylene is preferably 40 to 75 parts by mass and more preferably 45 to 70 parts by mass relative to 100 parts by mass of the non-volatile matter of the radical polymerizable composition, to provide a composition having a low viscosity and a cured product having a high refractive index.

The radical polymerizable composition of the present invention may optionally include other additives. Examples of the other additives include an ultraviolet absorber, an antioxidant, a silicone-based additive, a fluorine-based additive, a rheology-controlling agent, a defoaming agent, an antistatic agent, and an antifogging agent. The amount of the additive added is preferably 0.01 to 40 parts by mass relative to 100 parts by mass of the radical polymerizable composition of the present invention. Within the range, the effects of the additives are sufficiently produced and ultraviolet curing is not prevented.

The viscosity of the radical polymerizable composition of the present invention is preferably 6000 mPa·s or less because the active-energy-ray-curable resin composition needs to completely fills every cavity of a die without defects even under high-speed-coating conditions.

The radical polymerizable composition of the present invention may be cured by an irradiation process with an active energy ray or a heating process.

In the case where the radical polymerizable composition is cured by irradiation with an active energy ray, the active energy ray may be, for example, an electron beam, an ultraviolet ray, or visible light. When an electron beam is used as the active energy ray, the curable composition of the present invention can be cured using a Cockcroft- Walton accelerator, a Van de Graaff electron accelerator, a resonant transformer accelerator, and an electron beam generator of an insulated core transformer type, a Dynamitron type, a linear filament type, or a high frequency type. When an ultraviolet ray is used as the active energy ray, the irradiation is performed using a mercury lamp such as an ultrahigh-pressure mercury lamp, a high-pressure mercury lamp, or a low-pressure mercury lamp, a xenon lamp, carbon arc, or a metal halide lamp to cure the curable composition. The exposure with the ultraviolet ray is preferably 0.1 to 1000 mJ/cm$^2$.

In the case where the radical polymerizable composition is cured by heating, the radical polymerizable composition can be cured by performing heating to the temperature range of 60° C. to 250° C.

A cured product of the radical polymerizable composition of the present invention has a high refractive index and good adhesiveness to a plastic film substrate. In consideration of such characteristics, the cured product can be suitably used for plastic lenses such as lenses for glasses, a lens for digital cameras, a Fresnel lens, and a prism lens; and various optical materials such as an optical over-coating agent, a hard coating agent, an antireflection film, an optical fiber, an optical waveguide, a hologram, a prism lens, an LED sealing material, and a coating material for solar cells. Among them, the cured product is particularly suitable for plastic lenses such as a prism lens for liquid crystal substrates.

The prism lens for liquid crystal substrates is a sheet-shaped lens that includes a plurality of minute prismatic portions on one surface of a sheet-shaped molded body. The prism lens for liquid crystal substrates is normally disposed on a back surface (light source side) of a liquid crystal display device so that the prism plane faces the liquid crystal display device. Furthermore, a light-guiding sheet is disposed on the back surface of the sheet-shaped lens. In another case, the prism lens for liquid crystal substrates is a sheet-shaped lens that also functions as the light-guiding sheet.

Regarding the shape of the prismatic portions of the prism lens, the prism apex angle θ is preferably 70° to 110°, more preferably 75° to 100°, and particularly preferably 80° to 95° because a good light-condensing property is achieved and the luminance is improved.

The pitch of the prismatic portions is preferably 100 μm or less and particularly preferably 70 μm or less to prevent the formation of a moiré pattern on a screen and to further improve the definition of the screen. The difference between the depressions and projections of the prismatic portions is determined depending on the prism apex angle θ and the pitch of the prismatic portions, and is preferably 50 μm or less. The sheet thickness of the prism lens is preferably as large as possible from the viewpoint of strength, but is preferably as small as possible from the optical viewpoint to suppress the absorption of light. To achieve a good balance, the sheet thickness is preferably 50 to 1000 μm.

The prism lens is produced using the radical polymerizable composition of the present invention by, for example, the following method. The composition is applied to a forming die such as a metal die or resin die having a prism pattern formed therein. The surface of the composition is smoothed and then a transparent substrate is placed thereon. The composition is cured by being irradiated with an active energy ray from the transparent substrate side.

The transparent substrate may be a glass substrate or a plastic substrate composed of acrylic resin, polycarbonate resin, polyester resin, polystyrene resin, fluorocarbon resin, or polyimide resin. When the radical polymerizable composition of the present invention is used, good adhesiveness to any of these substrates can be achieved.

In the case where the radical polymerizable composition of the present invention is used as an optical material for the prism lens or the like, the refractive index of a cured product of the radical polymerizable composition is preferably 1.5500 or more and more preferably 1.5700 or more.

EXAMPLES

The present invention will now be specifically described based on Examples and Comparative Examples.

In the present invention, the weight-average molecular weight (Mw) was measured by gel permeation chromatography (GPC) under the following conditions.

Measurement instrument; HLC-8220GPC manufactured by Tosoh Corporation

Columns; TSK-GUARDCOLUMN SuperHZ-L manufactured by Tosoh Corporation
+ TSK-GEL SuperHZM-M×4, manufactured by Tosoh Corporation Detector; RI (differential refractometer)

Data processing; Multistation GPC-8020 model II manufactured by Tosoh Corporation Measurement conditions; Column temperature 40° C.

Solvent tetrahydrofuran

Flow rate 0.35 ml/min

Standard; monodisperse polystyrene

Sample; sample (100 μl) obtained by filtering a tetrahydrofuran solution having a concentration of 0.2 mass % in terms of resin solid matter through a microfilter In the present invention, the viscosity was measured at 25° C. with an E-type rotational viscometer ("RE80U" manufactured by Toki Sangyo Co., Ltd.).

In the present invention, the refractive index was measured with an Abbe refractometer ("NAR-3T" manufactured by ATAGO CO., LTD.). The measurement was normally performed at 25° C. If the object is solid at 25° C., the measurement was performed at an appropriate temperature.

In the present invention, the measurement of $^1$H-NMR was performed with NMR "GSX270" manufactured by JEOL Ltd. at 300 MHz using a deuterochloroform solvent.

In the present invention, the gas chromatography-mass spectrum was measured with a gas chromatography-mass spectrometer (GC-MS) ("GC-2010" manufactured by SHIMADZU CORPORATION, column: "Zebron ZB-5" manufactured by SHIMADZU CORPORATION) under the following conditions: He carrier gas, flow rate 1.47 mL/min, column oven 50° C., vaporizing chamber 300° C., and temperature rise 50° C. to 300° C. (25° C./min).

In the present invention, high-performance liquid chromatography (LC) was performed with a high-performance liquid chromatograph ("2695" manufactured by Waters, column: "L-Column2 ODS" manufactured by Chemical Evaluation and Research Institute) under the following conditions: detection UV 240 nm, temperature 40° C., flow rate 1 mL/min, and acetonitrile/water=70/30 to 100/0.

In the present invention, gas chromatography (GC) was performed with a gas chromatograph ("6850 Series" manufactured by Agilent Technologies, column: "Agilent DB-1" manufactured by Agilent Technologies) under the following conditions: He carrier gas, flow rate 1 mL/min, injection temperature 300° C., detection temperature 300° C., and temperature rise 50° C. to 325° C. (25° C./min).

Production Example 1

Synthesis of ortho-phenylbenzyl acrylate

Into a 200 mL three-neck flask equipped with a stirrer, a thermometer, a cooling tube, and a calcium chloride tube, 20.0 g of ortho-phenylbenzyl alcohol, 100.0 g of anhydrous toluene, 13.2 g of triethylamine, and 7.8 mg of methoquinone were charged, and they were cooled to 10° C. or less using an ice bath. Into the flask, 11.8 g of acryloyl chloride was dropped over 30 minutes. The temperature was increased to room temperature and a reaction was caused to proceed for two hours. After the reaction, the reaction solution was poured into water and washed with a 5% NaOH aqueous solution and a saline solution, and the solvent was distilled off to obtain an orange liquid. The orange liquid was purified with a silica gel column to obtain 20.44 g of ortho-phenylbenzyl acrylate. The obtained ortho-phenylbenzyl acrylate was a colorless, transparent liquid at ordinary temperature and had a refractive index of 1.5776 and a viscosity of 27 mPa·s at 25° C. The measurement result of $^1$H-NMR is shown below.

$^1$H-NMR (CDCl$_2$, 300 MHz): 7.53-7.49 (m, 1H of Ph), 7.48-7.28 (m, 8H of Ph), 6.41-6.34 (q, 1H of CH=CH), 6.34-6.07 (q, 1H of CH=CH), 5.82-5.77 (q, 1H of CH=CH), 5.13 (s, 2H of CH$_2$-Ph).

Production Example 2

Synthesis of meta-phenylbenzyl acrylate

Into a 200 mL four-neck flask equipped with a stirrer, a thermometer, and a cooling tube, 20.0 g of 3-(bromomethyl)biphenyl, 39.3 g of anhydrous dimethylformamide, 13.4 g of anhydrous potassium carbonate, and 6.2 mg of methoquinone were charged, and acrylic acid was added thereto at room temperature. After the completion of foaming of carbon dioxide, the mixture was heated to a reaction temperature of 90° C. and a reaction was caused to proceed for two hours. The temperature was decreased to room temperature, and then dilution with 120 mL of water, extraction with 100 g of toluene, and washing with water were performed. The resultant crude reaction product was purified with a silica gel column to obtain 16.1 g of meta-phenylbenzyl acrylate. The obtained meta-phenylbenzyl acrylate was a colorless, transparent liquid at ordinary temperature and had a refractive index of 1.5888 and a viscosity of 24 mPa·s at 25° C. The measurement result of $^1$H-NMR is shown below.

$^1$H-NMR (CDCl$_2$, 300 MHz): 7.60-7.32 (m, 9H of Ph), 6.50-6.42 (q, 1H of CH=CH), 6.22-6.12 (q, 1H of CH=CH), 5.87-5.82 (q, 1H of CH=CH), 5.26 (s, 2H of CH$_2$-Ph).

Production Example 3

Synthesis of para-phenylbenzyl acrylate

The same process as in Synthetic Example 1 was conducted except that the ortho-phenylbenzyl alcohol in Synthetic Example 1 was changed to para-phenylbenzyl alcohol. Consequently, 22.4 g of para-phenylbenzyl acrylate was obtained. The obtained para-phenylbenzyl acrylate was solid at ordinary temperature and had a melting point of 32° C. and a refractive index of 1.5920 at 40° C. The measurement result of $^1$H-NMR is shown below.

$^1$H-NMR (CDCl$_2$, 300 MHz): 7.62-7.32 (m, 9H of Ph), 6.50-6.43 (q, 1H of CH=CH), 6.23-6.12 (q, 1H of CH=CH), 5.88-5.84 (q, 1H of CH=CH), 5.27 (s, 2H of CH$_2$-Ph).

Production Example 4

Synthesis of 4,4'-bis(acryloylmethyl)biphenyl

Into a 200 mL four-neck flask equipped with a stirrer, a thermometer, and a cooling tube, 18.0 g of 4,4'-chloromethylbiphenyl, 100 mL of anhydrous dimethylformamide, 25.0 g of anhydrous potassium carbonate, and 100 mg of methoquinone were charged. The mixture was heated to a reaction temperature of 120° C. while being bubbled with air and a reaction was caused to proceed for 15 minutes. After the temperature was decreased to 50° C., the reaction liquid was poured into 300 mL of distilled water. The precipitated crystal was filtered and dried. Then, recrystallization was performed using 80 mL of ethanol to obtain 14.5 g of 4,4'-bis(acryloylmethyl)biphenyl. The obtained 4,4'-bis(acryloylmethyl)biphenyl was a crystal having a melting point of 61° C. to 62° C. and had a refractive index of 1.5648 at 70° C. The measurement results of $^1$H-NMR and mass spectrometry are shown below.

$^1$H-NMR (CDCl$_2$, 300 MHz): 7.67-7.46 (m, 4H of Ph), 7.44-7.28 (m, 4H of Ph), 6.50-6.43 (q, 2H of CH=CH), 6.23-6.12 (q, 2H of CH=CH), 5.88-5.84 (q, 2H of CH=CH), 5.27 (s, 4H of CH$_2$-Ph).

GC-MS: [M+H]$^+$=323

Production Example 5

Synthesis of biphenyl Compound

Into a 5 L four-neck flask equipped with a stirrer, a cooling tube, and a thermometer, 709 g of diphenyl, 276 g of paraformaldehyde, 1381 g of acetic acid, 958 g of concentrated hydrochloric acid, and 117 g of iron trichloride were charged, and the temperature was increased to 80° C. After it was confirmed that the charged solution had a temperature of 80° C., a reaction was caused to proceed for 15 hours. During the reaction, a solid was precipitated. After the completion of the reaction, the reaction liquid was filtered at 60° C. to collect the precipitated solid. The solid was washed with 500 mL of methanol and dried to obtain 90 g of a biphenyl compound in the form of a solid. As a result of measurement by liquid chromatography, it was confirmed that the obtained biphenyl compound included biphenyl compounds in which the number of biphenyl structural units in a molecular structure was 2, 3, and 4. The contents of the biphenyl compounds are as follows. Biphenyl compound (two structural units): 99.24% (retention time: 15.73 to 17.08 min), Biphenyl compound (three structural units): 0.54% (retention time: 19.93 to 20.55 min), Biphenyl compound (four structural units): 0.22% (retention time: 21.99 to 22.23 min)

Production Example 6

Production of Mixture (1) of phenylbenzyl methacrylate (A), bis(acryloylmethyl)biphenyl (B), biphenyl, and biphenyl Compound (C) Having a Molecular Structure in which biphenyl Structures are Bonded to Each Other Through a methylene

Synthesis of chloro Intermediate

Into a 5 L four-neck flask equipped with a stirrer, a cooling tube, a thermometer, and a hydrogen chloride gas inlet unit, 709 g of diphenyl, 276 g of para-formaldehyde, 1381 g of acetic acid, and 958 g of concentrated hydrochloric acid were charged, and the temperature was increased to 80° C. After it was confirmed that the charged solution had a temperature of 80° C., hydrogen chloride gas was introduced into the charged solution at 20 g/hour through a Kinoshita glass ball filter (fritted gas dispersion tube). It was confirmed that the dissolution of the hydrogen chloride gas in the charged solution was saturated, and then 1061 g of phosphoric acid was dropped into the charged solution over one hour and a reaction was caused to proceed for 30 hours. Immediately after the completion of the reaction, a lower layer was removed from the reaction solution, and 2.3 kg of toluene was added to an organic layer and the organic layer was washed with a 12.5% aqueous sodium hydroxide solution, a saturated aqueous sodium hydrogen carbonate solution, and distilled water. The organic layer was distilled off to obtain 908 g of a chloro intermediate in the form of a white solid.

Acryloylation

Nine hundred and eight grams of the obtained intermediate was dissolved in 1603 g of DMF serving as a reaction solvent, and 372 g of potassium carbonate was added thereto and methoquinone was added thereto so as to have a concentration of 300 ppm relative to the total amount. The intermediate solution was heated to 40° C., and then 323 g of acrylic acid was dropped into the intermediate solution for 1.5 hours. After the completion of the dropping, the intermediate solution was heated to 80° C. over two hours and stirred under heating at 80° C. for three hours. Subsequently, 3.4 kg of water and 1.8 kg of toluene were added to the obtained solution and extraction was performed. An organic layer was washed until an aqueous layer was neutralized. The organic layer was concentrated to obtain 995 g of a liquid sample. The sample was stored at 0° C. for two days, and consequently the precipitation of a crystal was not observed.

Analysis of Sample

The obtained sample had a liquid refractive index of 1.592 and a viscosity of 30 mPa·s at 25° C. The content of each component included in 100 parts by mass of the sample was measured with a gas chromatograph. The sample included 65.2 parts by mass of phenylbenzyl acrylate (A), 18.6 parts by mass of bis(acryloylmethyl)biphenyl (B), 2.3 parts by mass of a biphenyl compound (C) having a molecular structure in which biphenyl structures are bonded to each other through a methylene, 5.8 parts by mass of biphenyl, and 8.1 parts by mass of unreacted raw materials other than biphenyl. The mass ratio (molar ratio) of isomers of the phenylbenzyl acrylate (A) was [[ortho-phenylbenzyl acrylate]/[meta-phenylbenzyl acrylate]/[para-phenylbenzyl acrylate]]=20/1/79.

Production Example 7

Production of epoxy (meth)acrylate (X-1)

Into a 1 L flask equipped with a stirrer, a gas inlet tube, a condenser, and a thermometer, 487.6 parts by mass of bisphenol A epoxy resin ("EPICLON 1055" manufactured by DIC Corporation, epoxy equivalent 478 g/eq), 1.68 parts by mass of t-butylhydroxytoluene, and 0.28 parts by mass of methoxyhydroquinone were charged. Then, 72.1 parts by mass of acrylic acid and 2.8 parts by mass of triphenylphosphine were charged into the flask. An esterification reaction was performed at 110° C. for 12 hours while blowing air into the flask to obtain an intended epoxy (meth)acrylate (X-1). The epoxy acrylate (X-1) had an acid value of 0.1 mgKOH/g, an epoxy equivalent of 13,500 g/eq, a refractive index of 1.585, and a weight-average molecular weight (Mw) of 2500.

Production Example 8

Production of epoxy (meth)acrylate (X-2)

Into a 1 L flask equipped with a stirrer, a gas inlet tube, a condenser, and a thermometer, 220.3 parts by mass of o-cresol novolac epoxy resin ("EPICLON N-695" manufactured by DIC Corporation, epoxy equivalent 216 g/eq), 0.88 parts by mass of t-butylhydroxytoluene, and 0.15 parts by mass of methoxyhydroquinone were charged. Then, 72.1 parts by mass of acrylic acid and 1.5 parts by mass of triphenylphosphine were charged into the flask. An esterification reaction was performed at 110° C. for 12 hours while blowing air into the flask to obtain an intended epoxy acrylate (X-2). The epoxy (meth)acrylate (X-2) had an acid value of 0.1 mgKOH/g, an epoxy equivalent of 11,200 g/eq, a refractive index of 1.574, and a weight-average molecular weight (Mw) of 3800.

Production Example 9

Production of epoxy (meth)acrylate (X-3)

Into a 1 L flask equipped with a stirrer, a gas inlet tube, a condenser, and a thermometer, 175.4 parts by mass of bisphenol F epoxy resin ("EPICLON 830" manufactured by DIC Corporation, epoxy equivalent 172 g/eq), 0.74 parts by mass of t-butylhydroxytoluene, and 0.12 parts by mass of methoxyhydroquinone were charged. Then, 72.1 parts by mass of acrylic acid and 1.2 parts by mass of triphenylphosphine were charged into the flask. An esterification reaction was performed at 110° C. for 12 hours while blowing air into the flask to obtain an intended epoxy (meth)acrylate (X-3). The epoxy (meth)acrylate (X-3) had an acid value of 0.1 mgKOH/g, an epoxy equivalent of 12,800 g/eq, a refractive index of 1.562, and a weight-average molecular weight (Mw) of 680.

Example 1

Blend of Radical Polymerizable Composition

A radical polymerizable composition was obtained by mixing 18 parts by mass of the ortho-phenylbenzyl acrylate produced in Production Example 1, 82 parts by mass of the para-phenylbenzyl acrylate produced in Production Example 3, 60 parts by mass of the epoxy(meth)acrylate (X-1) produced in Production Example 7, and 6 parts by mass of a photopolymerization initiator ("IRGACURE-184" manufactured by Ciba Specialty Chemicals).

Production of Cured Film

The obtained radical polymerizable composition was applied onto a chrome-plated metal sheet. A transparent PET film having an untreated surface was placed on the resultant composition layer, and the thickness of the composition layer was adjusted to 50 μm. The composition layer was cured by being irradiated with an ultraviolet ray having 500 mJ/cm$^2$ using a high-pressure mercury lamp from the transparent substrate side. Thus, a layered body was obtained. A cured layer of the radical polymerizable composition was removed from the metal sheet and transparent substrate of the layered body to obtain a cured film.

Cured Film with Substrate

A layered body was obtained through the same process as that of the production of the cured film, except that the substrate was changed to a transparent PET film whose surface was treated so as to have adhesiveness. Only the metal sheet was removed from the layered body to obtain a cured film with a substrate.

Evaluations

Various evaluations below were conducted for the radical polymerizable composition, the cured film, and the cured film with a substrate.

Evaluation 1: Measurement of Refractive Index

The cured film produced in Example 1 was brought into contact with a prism of an Abbe refractometer ("NAR-3T" manufactured by ATAGO CO., LTD.) using 1-bromonaphthalene and the refractive index at 25° C. was measured.

Evaluation 2: Initial Adhesiveness

The adhesiveness of the cured layer to the substrate of the cured film with a substrate produced in Example 1 was measured in conformity with JIS K 5400. An evaluation of "Excellent" was given when all squares were left. An evaluation of "Good" was given when the number of squares left was (95 to 99)/100. An evaluation of "Fair" was given when the number of squares left was (80 to 94)/100. An evaluation of "Poor" was given when the number of squares left was less than 80.

Evaluation 3: Boiling Water Adhesiveness (Accelerating Test for Evaluating Adhesiveness to Substrate)

The cured film with a substrate produced in Example 1 was immersed in boiling water having a temperature of 95° C. or more for 4 hours and then left to stand at room temperature for 2 hours. Regarding the cured film with a substrate subjected to the boiling water treatment, the adhesiveness of the cured layer to the substrate was measured in conformity with JIS K 5400. An evaluation of "Excellent" was given when all squares were left. An evaluation of "Good" was given when the number of squares left was (95 to 99)/100. An evaluation of "Fair" was given when the number of squares left was (80 to 94)/100. An evaluation of "Poor" was given when the number of squares left was less than 80.

Examples 2 to 12

A radical polymerizable composition, a cured film, and a cured film with a substrate were produced in the same manner as in Example 1, except that the mixing ratio listed in Table 1 or 2 was employed. Then, the above-described evaluations were conducted. Tables 1 and 2 show the evaluation results.

TABLE 1

| Compound | Example 1 | Example 2 | Example 3 | Example 4 | Example 5 | Example 6 |
|---|---|---|---|---|---|---|
| Ortho-phenylbenzyl acrylate (Production Example 1) [part by mass] | 18 | 18 | 50 | | 18 | 18 |
| Meta-phenylbenzyl acrylate (Production Example 2) [part by mass] | | | | 18 | | |
| Para-phenylbenzyl acrylate (Production Example 3) [part by mass] | 82 | 82 | 50 | 82 | 82 | 82 |
| 4,4'-bis(acryloylmethyl)biphenyl (Production Example 4) [part by mass] | | | | | | |
| Biphenyl compound (Production Example 5) [part by mass] | | | | | | |
| Mixture (1) (Production Example 6) [part by mass] | | | | | | |
| Epoxy (meth)acrylate (X-1) (Production Example 7) [part by mass] | 60 | 80 | 60 | 60 | | |
| Epoxy (meth)acrylate (X-2) (Production Example 8) [part by mass] | | | | | 60 | |
| Epoxy (meth)acrylate (X-3) (Production Example 9) [part by mass] | | | | | | 60 |
| Initiator | 6 | 7 | 6 | 6 | 6 | 6 |
| Viscosity (mPa·s) | 2900 | 4800 | 2600 | 2900 | 4000 | 1400 |
| Liquid refractive index | 1.5888 | 1.5883 | 1.5889 | 1.5890 | 1.5846 | 1.5801 |
| Refractive index of cured product | 1.6120 | 1.6080 | 1.6130 | 1.6120 | 1.6080 | 1.6080 |
| Initial adhesiveness | Excellent | Excellent | Excellent | Excellent | Excellent | Excellent |
| Boiling water adhesiveness | Excellent | Excellent | Excellent | Excellent | Excellent | Excellent |

TABLE 2

| Compound | Example 7 | Example 8 | Example 9 | Example 10 | Example 11 | Example 12 |
|---|---|---|---|---|---|---|
| Ortho-phenylbenzyl acrylate (Production Example 1) [part by mass] | | | 80 | 40 | | |
| Meta-phenylbenzyl acrylate (Production Example 2) [part by mass] | | | | | | |
| Para-phenylbenzyl acrylate (Production Example 3) [part by mass] | | | | 40 | | |
| 4,4'-bis(acryloylmethyl)biphenyl (Production Example 4) [part by mass] | | | | | | |
| Biphenyl compound (Production Example 5) [part by mass] | | | 20 | 20 | | |
| Mixture (1) (Production Example 6) [part by mass] | 100 | 100 | | | 100 | 100 |
| Epoxy (meth)acrylate (X-1) (Production Example 7) [part by mass] | 60 | 80 | 60 | 60 | | |

TABLE 2-continued

| Compound | Example 7 | Example 8 | Example 9 | Example 10 | Example 11 | Example 12 |
|---|---|---|---|---|---|---|
| Epoxy (meth)acrylate (X-2) (Production Example 8) [part by mass] | | | | | 60 | |
| Epoxy (meth)acrylate (X-3) (Production Example 9) [part by mass] | | | | | | 60 |
| Initiator | 6 | 7 | 6 | 6 | 6 | 6 |
| Viscosity (mPa·s) | 2700 | 4500 | 3100 | 3600 | 3800 | 1200 |
| Liquid refractive index | 1.5893 | 1.5888 | 1.5758 | 1.5831 | 1.5851 | 1.5806 |
| Refractive index of cured product | 1.6150 | 1.6100 | 1.6010 | 1.6080 | 1.6090 | 1.6100 |
| Initial adhesiveness | Excellent | Excellent | Excellent | Excellent | Excellent | Excellent |
| Boiling water adhesiveness | Excellent | Excellent | Excellent | Excellent | Excellent | Excellent |

Comparative Examples 1 and 2

A radical polymerizable composition, a cured film, and a cured film with a substrate were produced in the same manner as in Example 1, except that the mixing ratio listed in Table 3 was employed. Then, the above-described evaluations were conducted. Table 3 shows the evaluation results. The resin composition produced in Comparative Example 2 had an extremely high viscosity and therefore the viscosity and liquid refractive index could not be measured. Furthermore, the application of the resin composition was impossible and thus the evaluations of the film were also impossible.

TABLE 3

| Compound | Comparative Example 1 | Comparative Example 2 |
|---|---|---|
| Epoxy (meth)acrylate (X-1) (Production Example 7) [part by mass] | | 60 |
| Fluorene | 60 | 100 |
| OPPEA | 100 | |
| Initiator | 6 | 6 |
| Viscosity | 3000 | could not be measured |
| Liquid refractive index | 1.5887 | could not be measured |
| Refractive index of cured product | 1.6130 | could not be applied |
| Initial adhesiveness | Good | could not be applied |
| Boiling water adhesiveness | Poor | could not be applied |

Footnote of Table 3

Fluorene (9,9-bis[4-(2-acryloyloxyethoxy)phenyl]fluorene): "A-BPEF" manufactured by Shin Nakamura Chemical Co., Ltd. OPPEA (ortho-phenylphenoxyethyl acrylate): "Miramer M1142" manufactured by Miwon Specialty Chemical Co., Ltd.

The invention claimed is:

1. A radical polymerizable composition comprising phenylbenzyl (meth)acrylate (A), an epoxy (meth)acrylate (X) having an aromatic ring in its molecular structure, and a radical polymerization initiator (Y) as essential components,
    wherein the phenylbenzyl (meth)acrylate (A) includes ortho-phenylbenzyl (meth)acrylate and para-phenylbenzyl (meth)acrylate at a molar ratio [[ortho-phenylbenzyl (meth)acrylate]/[para-phenylbenzyl (meth)acrylate]] of 55/45 to 10/90; and
    wherein the epoxy (meth)acrylate (X) having an aromatic ring in its molecular structure has a weight-average molecular weight (Mw) of 350 to 5000.

2. The radical polymerizable composition according to claim 1, wherein the content of the epoxy (meth)acrylate (X) having an aromatic ring in its molecular structure is 50 to 100 parts by mass relative to 100 parts by mass of the phenylbenzyl (meth)acrylate (A).

3. The radical polymerizable composition according to claim 1, wherein the epoxy (meth)acrylate (X) having an aromatic ring in its molecular structure is an epoxy (meth)acrylate having a bis(phenylene)alkane skeleton in its molecular structure.

4. A cured product obtained by curing the radical polymerizable composition according to claim 1.

5. A plastic lens obtained by curing the radical polymerizable composition according to claim 1.

6. A cured product obtained by curing the radical polymerizable composition according to claim 2.

7. A cured product obtained by curing the radical polymerizable composition according to claim 3.

8. A plastic lens obtained by curing the radical polymerizable composition according to claim 2.

9. A plastic lens obtained by curing the radical polymerizable composition according to claim 3.

* * * * *